(12) United States Patent
Durand et al.

(10) Patent No.: US 7,656,932 B2
(45) Date of Patent: *Feb. 2, 2010

(54) DIGITAL RECEIVER DEVICE

(75) Inventors: Benoît Durand, Rousset (FR);
Christophe Fraschini, La Garde (FR);
Philippe Courmontagne, Belgentier (FR); Anne Collard Bovy, Bouc Bel Air (FR); Stephane Meillere, Nedules (FR)

(73) Assignees: STMicroelectronics (Rousset) SAS, Rousset (FR); Universite de Provence (AIX Marseille I), Marseille Cedex (FR)

( * ) Notice: Subject to any disclaimer, the term of this patent is extended or adjusted under 35 U.S.C. 154(b) by 558 days.

This patent is subject to a terminal disclaimer.

(21) Appl. No.: 11/429,452

(22) Filed: May 4, 2006

(65) Prior Publication Data
US 2006/0262833 A1  Nov. 23, 2006

(30) Foreign Application Priority Data
May 4, 2005 (FR) .................... 05 04588
May 4, 2005 (FR) .................... 05 04589
May 4, 2005 (FR) .................... 05 04591

(51) Int. Cl.
*H04B 1/00* (2006.01)
(52) U.S. Cl. .................. 375/143; 375/144; 375/343
(58) Field of Classification Search ................ 375/147, 375/136, 316, 324, 340, 143–144
See application file for complete search history.

(56) References Cited

U.S. PATENT DOCUMENTS

| | | | |
|---|---|---|---|
| 5,170,411 A | * | 12/1992 | Ishigaki ............... 375/147 |
| 5,241,561 A | | 8/1993 | Barnard et al. |
| 5,303,258 A | | 4/1994 | Nakamura et al. |
| 5,490,165 A | * | 2/1996 | Blakeney et al. ......... 370/335 |

(Continued)

FOREIGN PATENT DOCUMENTS

| EP | 1 339 167 A | 8/2003 |
|---|---|---|
| FR | 2 573 589 A | 5/1986 |

OTHER PUBLICATIONS

J.F. Cavassilas, B. Xerri; "Extension de la notion de filtre adapte. Contribution a la detection de signaux courts en presence de termes perturbateurs", Revue Traitement Du Signal, vol. 10, No. 3, 1992, pp. 215-221, XP002363859.

(Continued)

*Primary Examiner*—Emmanuel Bayard
(74) *Attorney, Agent, or Firm*—Kevin D. Jablonski; Graybeal Jackson LLP

(57) ABSTRACT

A digital processing device for a modulated signal, arranged at the input of a radio frequency receiver chain, suited in particular to a transmission system a direct sequence spread spectrum operation, comprising an analog-to-digital converter performing undersampling of the signal received, leading to an overlapping of the frequency range of the undersampled wanted signal by the frequency range of an interfering signal, demodulation means connected at the output of the analog-to-digital converter in order to bring the undersampled wanted signal back to baseband, a low pass filter connected at the output of the demodulation means and a filter matched to the spreading code used, and an additional filtering unit arranged between the low pass filter and the matched filter, for implementing a stochastic matched filtering operation to improve the signal-to-noise ratio at the input of the matched filter.

38 Claims, 3 Drawing Sheets

U.S. PATENT DOCUMENTS

| | | | | |
|---|---|---|---|---|
| 5,511,099 | A * | 4/1996 | Ko et al. | 375/368 |
| 6,108,317 | A * | 8/2000 | Jones et al. | 370/320 |
| 6,134,264 | A | 10/2000 | Shiba et al. | |
| 6,393,077 | B1 | 5/2002 | Usui | |
| 6,459,743 | B1 | 10/2002 | Lipka | |
| 6,864,827 | B1 | 3/2005 | Tise et al. | |
| 7,263,133 | B1 * | 8/2007 | Miao | 375/267 |
| 7,433,382 | B1 * | 10/2008 | Miao | 375/141 |
| 2002/0018529 | A1 | 2/2002 | Dabak et al. | |
| 2002/0141504 | A1 | 10/2002 | Suzuki et al. | |
| 2002/0181614 | A1 | 12/2002 | Mostafa et al. | |
| 2004/0125860 | A1 * | 7/2004 | Tojo et al. | 375/146 |
| 2004/0131125 | A1 * | 7/2004 | Sanderford et al. | 375/261 |
| 2006/0018367 | A1 * | 1/2006 | Bui | 375/148 |
| 2006/0031274 | A1 * | 2/2006 | Haddadin et al. | 708/300 |
| 2006/0208945 | A1 * | 9/2006 | Kolanek | 342/377 |

OTHER PUBLICATIONS

Canales T J et al; "Adaptive Stochastic Filters", Proceedings of the Midwest Symposium on Circuits and Systems, Champaign, Aug. 14-16, 1989, New York, IEEE, US, vol. vol. 1 Symp. 32, Aug. 14, 1989, pp. 609-612, XP000139728.

Lakkis I et al; "Optimum eigenfilters and matched filters", Electronics Letters, IEE Stevenage, GB, vol. 32, No. 22, Oct. 24, 1996, pp. 2068-2070, XP006005913.

Rasmussen J L et al; "An adaptive technique for designing minimum phase models", Signals, Systems and Computers, 1991. 1991 Conference Record of the Twenty-Fifth Asilomar Conference on Pacific Grove, CA, USA Nov. 4-6, 1991, Los Alamitos, CA, USA, IEEE Comput. Soc, US, Nov. 4, 1991, pp. 654-658, XP010026383.

Stewart K A; "Effect of sample clock jitter on IF-sampling Is-95 receivers", Personal, Indoor and Mobile Radio Communications, 1997. Waves of the Year 2000, PIMRC '97., The $8^{th}$ IEEE International Symposium on Helsinki, Finland Sep. 1-4, 1997, New York, NY, USA, IEEE, US, vol. 2, Sep. 1, 1997, pp. 366-370, XP010247670.

Jean-Francois Cavassilas; "Le filtrage adapte stochastique", Internet Article, Online! XP002363860 Extrait de l'Internet: URL:http://cava.unit-tln.fr/Adapte.pdf> 'extrait le Jan. 20, 2006!

French Search Report for FR 0504591 dated Feb. 6, 2006.
French Search Report for FR 0504589 dated Feb. 6, 2006.
French Search Report for FR 0504588 dated Feb. 6, 2006.

* cited by examiner

DIGITAL RECEIVER DEVICE

PRIORITY CLAIM

This application claims priority from French patent application Nos. 0504591, filed May 4, 2005, 0504589 filed May 4, 2005, and 0504588, filed May 4, 2005, which are incorporated herein by reference.

CROSS REFERENCE TO RELATED APPLICATIONS

This application is related to U.S. patent application Ser. No. 11/429,392 entitled RECEIVER DEVICE SUITED TO A TRANSMISSION SYSTEM USING A DIRECT SEQUENCE SPREAD SPECTRUM and Ser. No. 11/429,674 entitled DIGITAL RECEIVING DEVICE BASED ON AN INPUT COMPARATOR which have a common filing date and owner and which are incorporated by reference.

TECHNICAL FIELD

In a general way, an embodiment of the invention relates to the processing of digital signals and, in particular, the techniques for decoding such signals. More specifically, an embodiment of the invention relates to a digital processing device that is arranged at the input of a radio frequency receiver chain and that is particularly suited to a transmission system using a direct sequence spread spectrum, conventionally implemented using phase modulation of the BPSK type (for "Binary Phase Shift Keying").

BACKGROUND

In a system for transmitting a digital signal using a direct sequence spread spectrum, the "0" and "1" bits are encoded with respective symbols sent by the transmitter, and decoded at the receiver by a finite impulse response (FIR) filter.

In the case where the bits are encoded using a spreading code of length N, the symbols encoding the "0" and "1" bits are each in the form of a series of N symbol elements distributed over either of two different levels and transmitted at a predetermined fixed frequency F.

The N symbol elements encoding the "1" bit are anti-correlated to the corresponding N symbol elements encoding the "0" bit, i.e., the symbol elements of the same rank within both of these two symbols have opposite values.

For example, if and when a symbol element of the symbol encoding the "1" bit is at level 1, the corresponding symbol element of the symbol encoding the "0" bit is at level −1. In the same way, if and when a symbol element of the symbol encoding the "1" bit is at level −1, the corresponding symbol element of the symbol encoding the "0" bit is at level 1.

The development of digital radio frequency (RF) communications, together with the expansion of mobile telephony, in particular, may demand the use of multi-standard, very low consumption RF receiver chains. To reach these objectives, an attempt is made to reduce to a minimum the difficult-to-program, analog RF circuitry, by bringing the analog-to-digital converter (ADC) as close as possible to the receiving antenna. This is then referred to as a digital/digital/digital receiver chain.

However, a solution such as this may have the effect of increasing the operating frequency of the ADC in an unreasonable manner. As a matter of fact, given the frequency of the signals involved in radio frequency communications, and taking into account the Shannon-Nyquist Theorem (sampling frequency equal to at least twice the maximum frequency of the signal being sampled), an operation such as this may necessitate the use of an ADC whose operating frequency would be on the order of several gigahertz. Such an ADC is currently commercially unavailable.

For this reason, it is conventionally impractical to process the signal digitally from the moment of reception. Nevertheless, this problem may be solved by undersampling the digital input signal. This technique, known by the name of undersampling, is based on the principal of spectrum overlapping and comprises sampling the signal received, not on the basis of Shannon's Theorem, but at a frequency greater than twice the signal bandwidth. This is typically valid only if the signal in question is a narrowband signal, i.e., if the bandwidth to carrier frequency ratio is significantly lower than one. Such being the case, the signals involved in the context of RF communications may be considered as such. As a matter of fact, their carrier frequency is typically on the order of 2.45 GHz for a bandwidth of a few MHz. Within this context of narrowband signals, it becomes possible, according to the undersampling theory, to sample the signals at a rate much lower than that suggested by the Shannon Theorem and, more precisely as explained above, at a sampling frequency that depends only on the bandwidth.

In order to illustrate the foregoing, FIG. 1 is a schematic representation of a signal receiving and processing chain, wherein the signal is captured by an antenna 10, then amplified by a circuit 20 referred to as LNA (for "Low Noise Amplifier") prior to being submitted to the digital signal processing unit 30, referred to as DSP (for "Digital Signal Processing"). The output of the DSP unit may be processed conventionally by a processing unit 40, referred to as a CPU (for "Central Processing Unit").

FIG. 2 is a schematic representation of the various functional units involved in the conventional digital solution of the DSP unit of FIG. 1, which implements undersampling.

The DSP unit includes an analog-to-digital converter 31. The signal being a narrowband signal, the sampling frequency Fe is not selected according to the Shannon-Nyquist Theorem, but according to the undersampling theory. Therefore, Fe is determined irrespectively of the modulation carrier frequency. In fact, it is assumed to be equal to at least twice the bandwidth of the binary message after spread spectrum. For example, for a bandwidth of 2B, the sampling frequency Fe≧4B. Furthermore, the analog-to-digital converter carries out an M-bit encoding, e.g., 4-bit.

The ADC is followed by a stage 32 for estimating the new carrier frequency fp, designating the new center frequency of the signal after undersampling, and by the phase φ corresponding to the carrier phase. The estimation stage will likewise make it possible to determine the minimum number of samples necessary for describing a bit time (Tb), i.e., the time to transmit one bit of the spread message, which depends, in particular, on the length of the spreading code used.

According to the undersampling theory, the carrier frequency of the signal is modified and assumes the following as a new value:

$$fp = fm - k\frac{Fe}{2}$$

where fm represents the initial carrier frequency and where k designates a parameter of the undersampling verifying:

$$k < \frac{fm - B}{2B}$$

The phase signal after undersampling is estimated by using a phase estimator.

The signal present at the output of the estimation stage will be filtered by a band-pass type filter 33, so as to retain only the base motif of the undersampled signal. As a matter of fact, since the spectrum of the undersampled signal consists of a multiplicity of spectral motifs representative of the message, a bandpass filtering operation is carried out in order to retain only a single spectral motif. Therefore, the characteristics of this bandpass filter are as follows:

Center frequency: fp

Bandwidth: 4B

The filter may be either an infinite or finite impulse response filter (IIR, FIR).

The signal is subsequently brought back to baseband by demodulation means 34. The undersampled message being conveyed to the carrier frequency fp, this demodulation step comprises a simple multiplication step using a frequency fp of phase $\phi$ sinusoid, these two characteristic quantities coming from the estimation stage.

A low pass filtering stage 35 at the output of the demodulation stage makes it possible to eliminate the harmonic distortion due to spectral redundancy during demodulation of the signal. As a matter of fact, the demodulation operation reveals the spectral motif of the baseband signal but also at twice the demodulation frequency, i.e., at about the frequency 2fp.

A matched filter stage 36 corresponding to the code of the wanted signal makes it possible to recover the synchronization of the signal being decoded with respect to the wanted information. More precisely, this is a finite impulse response filter, characterized by its impulse response coefficients $\{a_i\}_{i=0,1,\ldots,n}$.

Its structure, described in FIG. 3, is that of a shift register REG receiving each sample of the input signal IN. The shift register includes N bistable circuits in the case of symbols with N symbol elements, which cooperate with a combinational circuit COMB, designed in a manner known by those skilled in the art and involving the series of coefficients $a_i$ such that the output signal OUT produced by the filter has an amplitude directly dependent upon the level of correlation observed between the sequence of the N last samples captured by this filter and the series of the N symbol elements of one of the two symbols, e.g., the series of the N elements of the symbol encoding a "1" bit of the digital signal.

Thus, the matched filtering operation comprises matching the series of coefficients $a_i$ to the exact replica of the selected spreading code, in order to correlate the levels of the symbol elements that it receives in succession at its input to the levels of the successive symbol elements of one of the two symbols encoding the "0" and "1" bits, e.g., the symbol elements of the symbol encoding the "1" bit.

The output signal from the finite impulse response filter 36 can then be delivered to a comparator capable of comparing the amplitude of this output signal to a lower threshold value and to an upper threshold value, in order to generate a piece of binary information. The comparator is thus equipped to deliver, as a digital output signal representative of a decoded symbol of the input signal, a first bit, e.g., "1", when the amplitude of the output signal of the filter 36 is higher than the value, and a second bit, e.g., "0", when the amplitude of the output signal of the additional filter is lower than the lower threshold value.

However, the undersampling technique, which is suitable in this context, and upon which the digital processing of the signal from the moment of its reception relies, results in a degradation of the signal-to-noise ratio after processing, primarily when an interfering signal (typically the noise of the transmission channel) cannot be considered a narrowband signal. The conventional digital receiver chain as just described may have serious malfunctions once the noise power in the transmission channel becomes elevated.

As a matter of fact, as a result of the undersampling, the so-called spectrum overlap phenomenon may conventionally be observed wherein all of the frequencies higher than half the sampling frequency are "folded" over the baseband, causing an unacceptable increase in the noise power in the signal being processed. This results in an unacceptable error rate at the output of the decoding process.

This signal-to-noise degradation phenomenon in the transmission channel, amplified by the undersampling technique employed, is a principal reason for which the reception solutions based on digital/digital/digital receiver chains are at present dismissed, despite the undeniable advantages that they might obtain in terms of programming and consumption, in particular.

In order to attempt to improve this signal-to-noise ratio degraded after processing, various solutions may be anticipated, short of being satisfactory. In particular, it might be anticipated to increase the power of the signal upon transmission, which, however, involves a consequential increase in the electrical power consumed by the circuit. It might also be anticipated to use larger spectrum-spreading codes, but this would be detrimental to the speed, which would thereby be greatly reduced.

SUMMARY

In this regard, an embodiment of the invention eliminates these disadvantages by proposing an improved "digital/digital/digital" receiver device, capable of correctly decoding a digital signal, even in the presence of a degradation of the signal-to-noise ratio after processing. In other words, the embodiment aims to reduce the error rate at the output of the decoding process for the same signal-to-noise ratio at the input of a digital/digital/digital receiver chain.

An embodiment of the invention relates to a digital processing device for a modulated signal, arranged at the input of a radio frequency receiver chain, suited in particular to a transmission system using binary carrier phase modulation by means of a binary message on which a direct sequence spread spectrum operation has been carried out, this device comprising an analog-to-digital converter performing undersampling of the signal received, leading to an at least partial overlapping of the frequency range of the undersampled wanted signal by the frequency range of a first interfering signal corresponding to the noise of the transmission channel, demodulation means connected at the output of the analog-to-digital converter in order to bring the undersampled wanted signal back to baseband, a low pass filter connected at the output of the demodulation means and a filter matched to the spreading code used, said device being characterized in that it includes an additional filtering unit arranged between the low pass filter and the matched filter, said filtering unit implementing a stochastic matched filtering operation for improving the signal-to-noise ratio at the input of the filter matched to the spreading code.

According to one embodiment, the additional filtering unit includes a plurality Q of finite impulse response base filters mounted in parallel, each of which receives an undersampled signal supplied at the output of the low pass filter, each filter being characterized by a set of N coefficients, this number N being determined such that it corresponds to the minimum number of samples for describing one bit of the spread message, the coefficients of each of the Q filters corresponding respectively to the components of the Q eigen vectors associated with at least the Q eigenvalues greater than 1 of the matrix $B^{-1}A$, where B is the variance-covariance matrix of the interfering signal and A the variance-covariance matrix of the wanted signal.

Advantageously, for each filter of the plurality Q of finite response filters, the additional filtering unit includes means for multiplying the signal obtained at the output of said filter, with, respectively, the central coefficient of the vector resulting from the product between the variance-covariance matrix of the interfering signal B and the eigen vector defining the coefficients of said filter, said unit further comprising means of summing up the vectors resulting from all of these operations, supplying a signal corresponding to the output signal of the reformatted low pass filter having an improved signal-to-noise ratio.

The device according to the above-described embodiment advantageously includes a comparator installed at the output of the additional filtering unit, capable of comparing the amplitude of the output signal supplied by the summation means to a threshold value and of delivering a binary signal at the output of the filtering unit based on said comparison.

More preferably, the comparator has an adjustable threshold value.

According to another characteristic, inserted between the analog-to-digital converter and the demodulation means, the device includes an estimation unit provided for estimating the center frequency of the signal after undersampling, the signal present at the output of the estimation unit being filtered by a band-pass filter before being applied to the demodulation means, so as to retain only a single spectral motif from amongst the plurality of spectral motifs representative of the signal after undersampling.

Advantageously, the estimation unit includes means for determining the parameter N defining the order of the filters of the plurality Q of finite response filters of the additional filtering unit, and for configuring the additional filtering unit using said parameter N.

Also, the sampling frequency corresponds to at least twice the bandwidth of the signal transmitted.

According to one embodiment, the filter matched to the spreading code is a digital finite impulse response filter.

BRIEF DESCRIPTION OF THE DRAWINGS

Characteristics and advantages of one or more embodiments of this invention will become more apparent upon reading the following description given by way of a non-limiting, illustrative example and made with reference to the appended figures.

DETAILED DESCRIPTION

An embodiment of the invention thus relates to a receiver device suited to a transmission system using a direct sequence spread spectrum and of the type comprising a digital processing device (DSP) for digitizing and processing the signal received at the moment of reception, by means of undersampling.

This embodiment is designed for receiving and decoding a digital input signal E composed of bits each of which, based on its "1" or "0" value, is represented by either of two symbols where each symbol comprises a series of N symbol elements, distributed over either of two different levels. These symbols, for example, may respond to a Barker code.

These symbol elements are delivered at a predetermined fixed frequency F corresponding to a determined period $T=1/F$, and the N symbol elements of the symbol encoding the "1" bit are anti-correlated to the corresponding N symbol elements of the symbol encoding the "0" bit.

Figure 1:
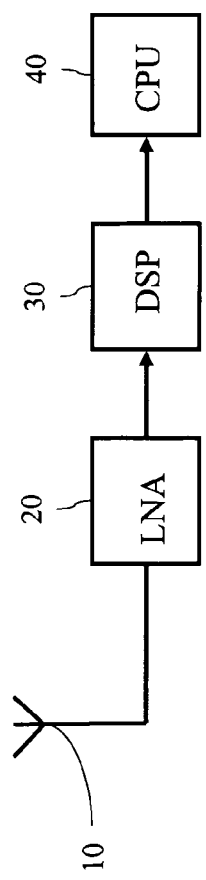
FIG. 1 is a schematic illustration of a conventional receiving and processing chain for a signal.
Figure 2:
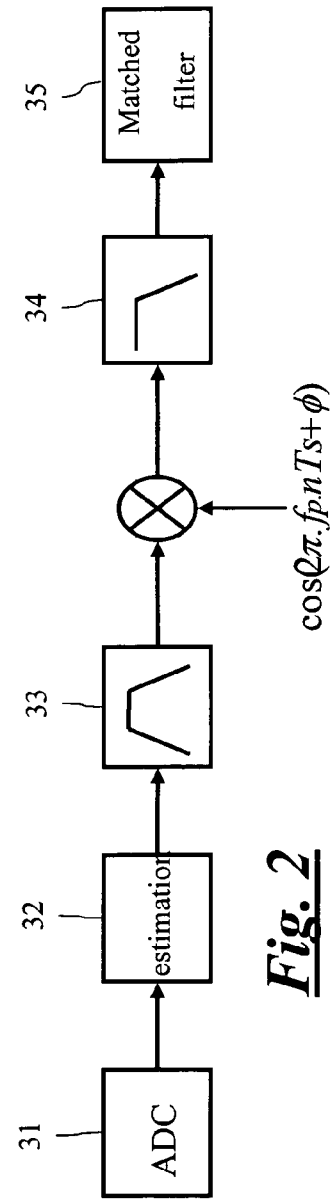
FIG. 2 is a schematic illustration of the various functional units involved in the conventional digital solution of the DSP unit of FIG. 1.

In order to be able to preserve the advantages in using a digital/digital/digital receiver device, the structure of which was described above with reference to FIGS. 1 and 2, while at the same time increasing its robustness towards noise, it is proposed to add to the structure of the DSP unit an additional filtering unit provided for being matched to the signal and mismatched to the noise.

Figure 4:
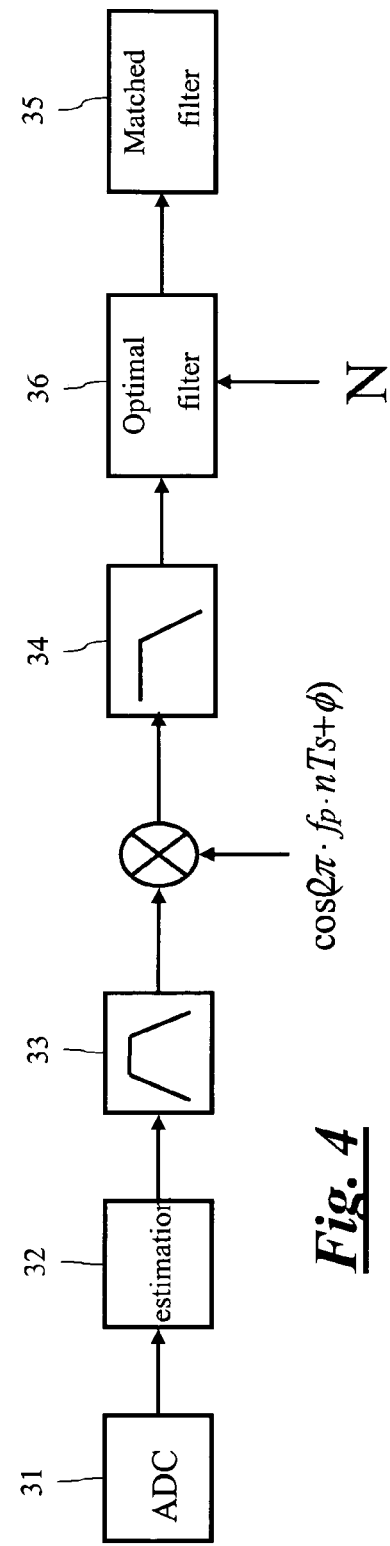
FIG. 4 is a schematic illustration of the design of a DSP unit according to an embodiment of the invention.

Therefore, as indicated in FIG. 4, the DSP unit according to an embodiment of the invention substantially includes, in addition to the elements already described, an optimal filter 37 such as this, provided for being positioned between the low pass filter 35 and the matched filter 36.

The parameter N, used for the configuration of the optimal filter 37, is estimated in the estimation unit 32 and designates the minimum number of samples for describing one bit-time, namely the number of samples taken in a period corresponding to the spreading code. Considering the undersampling frequency (Fe) adopted and the bit-time defined (Tb) upon transmission, this data is readily accessible:

$$N = \frac{T_b}{F_e} + 1$$

This data is then used to configure the filtering unit 37.

The addition to the DSP unit according to an embodiment of the invention of this additional filtering stage 37 arranged after the demodulation unit (low pass filtering included), and upstream from the matched filter, has the function of impeding the increase in noise power caused by spectrum overlap due to the undersampling operation.

A purpose in using this filter 37 is an improvement in the signal-to-noise ratio after processing in the digital receiver chain. In order to accomplish this, as will be explained in detail below, the unit 37 is based on a filtering technique known per se by the name of stochastic matched filtering.

Figure 5:
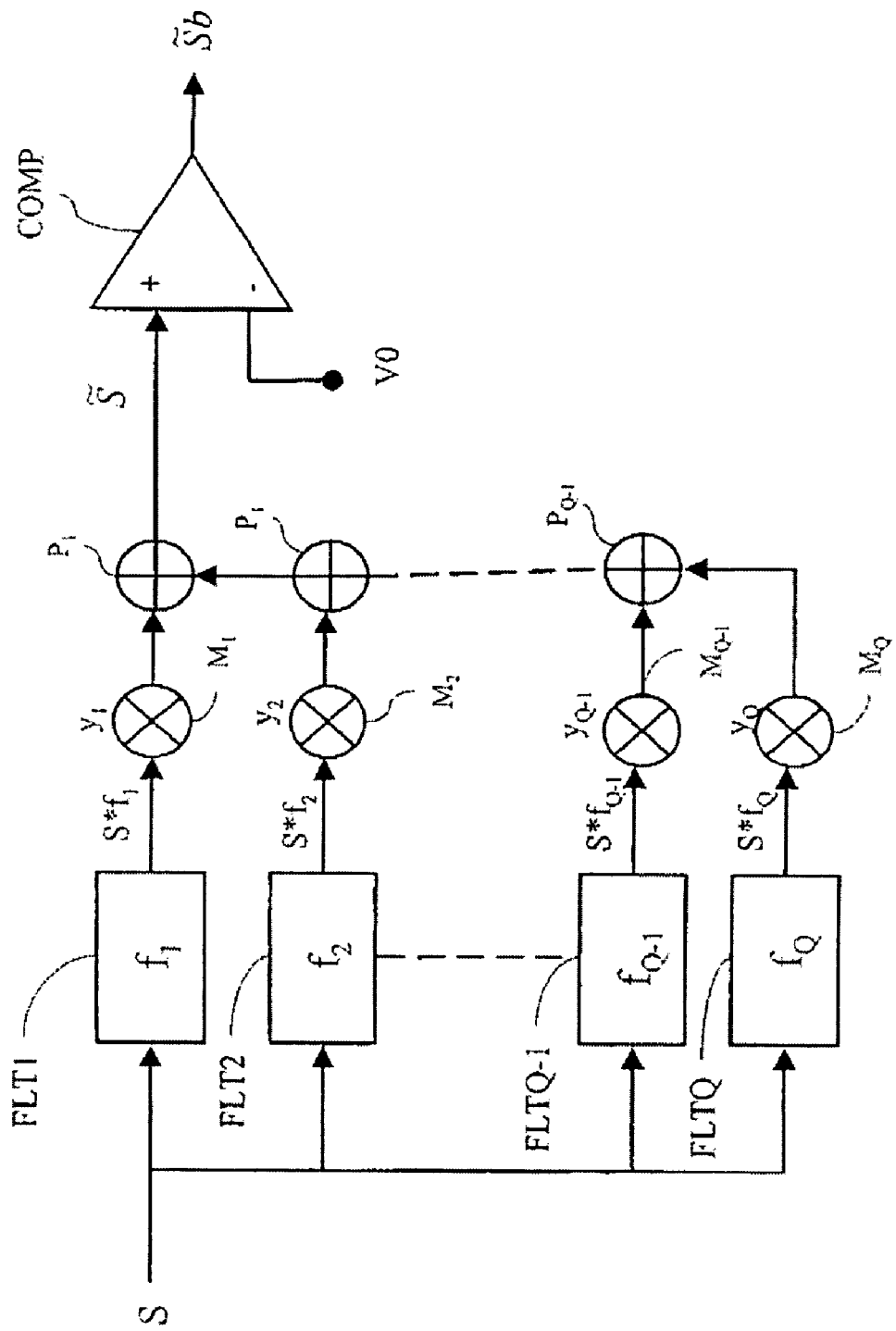
FIG. 5 shows an embodiment of the proposed additional filtering function at the output of the DSP unit demodulation stage (including the low pass filter).

A filtering technique such as this makes it possible to define a bank of Q digital filters FLT1 to FLTQ, mounted in parallel, as shown in FIG. 5, and provided for being matched to the signal while at the same time being mismatched to the noise. As concerns the principle of a stochastic matched filter, if s(t) and b(t) are considered to be two centered random signals, i.e., zero mathematical expectation, and if it is assumed that s(t) is the signal deemed to be of interest, and that b(t) is the interfering signal with a signal-to-noise ratio defined as being the ratio of the power of s(t) over the power of b(t), then the stochastic matched filtering comprises a set of several filters, where each filter, when applied to the additive mixture s(t)+b(t), improves the signal-to-noise ratio of the mixture.

The number of filters used depends heavily on the nature of the noise in the transmission channel, and their order is given by N (value estimated in the estimation unit 32, as explained above).

Figure 3:
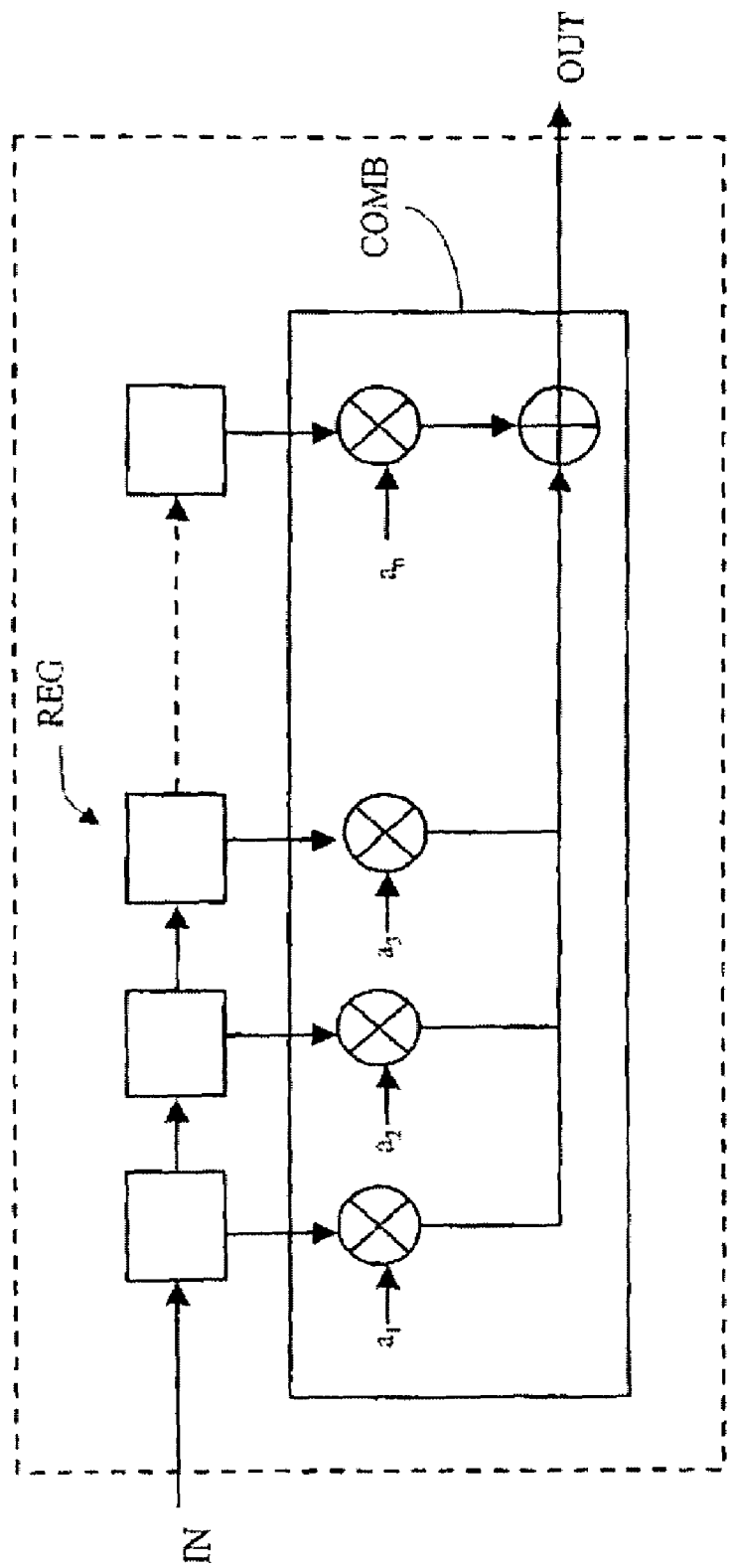
FIG. 3 is a schematic representation of the structure of a finite response filter matched to the spreading code used and implemented in the DSP unit of FIG. 2.

In practice, the N-order filters FLT1 to FLTQ are finite impulse response (FIR) filters and their structure is similar to that already described with reference to FIG. 3. Each of these filters, namely the filters FLT1 to FLTQ, receives, in parallel with the others, the signal to be decoded, as it is supplied at the output of the low pass filter 35.

Thus, it is appropriate to properly configure the optimal filtering unit 37 by selecting, first of all, the respective coefficients of each of the finite response filters FLT1 to FLTQ, in a way that makes it possible to improve the signal-to-noise ratio (transmission channel and quantizing noises) upstream from the matched filter 36 in the receiver chain. In order to accomplish this, according to the principles of stochastic matched filtering, the coefficients of these filters will be determined, on the one hand, based on the use of statistical parameters representative of the signal and, on the other hand, the noise.

In practice, the coefficients of each filter actually correspond, respectively, to the components of certain eigen vectors, recorded as $f_1$ to $f_q$, of the matrix $B^{-1}A$, where B is the variance-covariance matrix of the noise after demodulation and A is the variance-covariance matrix of the wanted signal. The signals resulting from the filtering operations with the filters FLT1 to FLTQ are recorded as S*f1 to S*fQ.

As a matter of fact, the signal received can be represented by a random vector whose components correspond, in practical terms, to the samples of the sampled signal.

Let X be such a random vector with countable elements noted as $X^k$. The following notations are adopted:

$$x = \begin{pmatrix} x_1 \\ x_2 \\ \vdots \\ x_n \end{pmatrix} \quad x^k = \begin{pmatrix} x_1^k \\ x_2^k \\ \vdots \\ x_n^k \end{pmatrix}$$

From this point of view, the component $x_i$ is a random number and the component $x_i^k$ is an element of $x_i$ with the probability pk. The coefficients $x_i$ thus correspond to the samples of the sampled signal.

The mathematical expectation of $x_i$, noted as $E\{x_i\}$, is defined as follows:

$$E\{x_i\} = \sum_{k=0}^{\infty} p_k x_i^k$$

This definition thus makes it possible to introduce the mathematical expectation of such a random vector:

$$E\{X\} = \begin{pmatrix} E\{x_1\} \\ E\{x_2\} \\ \vdots \\ E\{x_n\} \end{pmatrix}$$

By definition, it is recalled that the variance-covariance matrix of the random vector X, noted as G, is defined by:

$G = E\{XX^T\}$; with $XX^T$ defining the dyad of the vector X by the vector X, which is also noted as:

$$G = \begin{pmatrix} E\{x_1x_1\} & E\{x_1x_2\} & E\{x_1x_3\} & \cdots & E\{x_1x_n\} \\ E\{x_2x_1\} & E\{x_2x_2\} & E\{x_2x_3\} & \cdots & E\{x_2x_n\} \\ E\{x_3x_1\} & E\{x_3x_2\} & E\{x_1x_3\} & \cdots & E\{x_3x_n\} \\ \vdots & \vdots & \vdots & & \vdots \\ E\{x_nx_1\} & E\{x_nx_2\} & E\{x_nx_3\} & \cdots & E\{x_nx_n\} \end{pmatrix}$$

When the coefficients $x_i$ correspond, as is the case here, to the samples of a stationary random signal, i.e., $E\{x_ix_j\}$ depends only on (j−i), then it is possible to construct the variance-covariance matrix only from the set of coefficients $E\{x_1x_1\}$, $E\{x_1x_2\}$, $E\{x_1x_3\}$, ... $E\{x_1x_n\}$. In this case, these coefficients correspond to the values assumed by the autocorrelation function of the signal observed.

In practice, the calculation of the coefficients of the matrices A and B, respectively, can be performed using the values assumed by the autocorrelation function of the wanted signal and the noise, respectively.

As a matter of fact, the fact of spreading the original message being transmitted will obtain for it certain statistical properties. In particular, one realizes that its autocorrelation function corresponds to the deterministic autocorrelation function of the spreading code used. Advantageously, the autocorrelation function corresponding to the wanted signal will always be identical for a given spreading code, irrespective of the message being transmitted. Thus, when the message being transmitted is always spread with the same code, the autocorrelation function associated with the signal remains fixed, the statistics of the signal actually being more closely linked to the spreading code used than to the signal itself.

Furthermore, it is also assumed that the noise is stationary, i.e., that its statistical characteristics will not vary over time. As a matter of fact, the noise can be characterized, in terms of frequencies, by the bandwidth of the low pass filter 34, of which the cut-off frequency is known. Thus, the autocorrelation function associated with the noise, which is determined in a known manner from the spectral density of the noise at the output of the low pass filter 34, remains invariant. An invariant model is thus obtained for the autocorrelation function of the noise.

Using the two thus calculated autocorrelation functions for the wanted signal and for the noise, the variance-covariance matrices A and B can thus be calculated. The dimensions of the matrices A and B are equal to N, corresponding to the number of samples required to describe a bit-time. The eigenvalues and eigen vectors of the matrix $B^{-1}A$ can then be calculated.

In fact, the respective coefficients of the N-order filters FLT1 to FLTQ correspond to the components of the Q eigen vectors associated with at least the Q eigenvalues greater than 1 of the matrix $B^{-1}A$.

Mathematically speaking, the coefficients of the filters are the generic coefficients of the eigen vectors $f_n$ defined by the problem having the following eigenvalues:

$Af_n = \lambda_n B f_n$, where A represents the variance-covariance matrix of the wanted signal, and B that of the noise after demodulation.

Only the eigen vectors $f_n$ associated with the eigenvalues $\lambda_n$ greater than one are retained. It follows then, that if Q eigenvalues are greater than 1, the filter bank of the stochastic matched filtering unit will consist of Q filters.

As a matter of fact, all of the eigen vectors of the matrix $B^{-1}A$ associated with eigenvalues greater than 1 are representative of the signal, and all of the eigen vectors of the matrix $B^{-1}A$ associated with eigenvalues lesser than 1 are representative of the noise. In other words, only the eigen vectors of the matrix $B^{-1}A$ associated with eigenvalues greater than 1 improve the signal-to-noise ratio.

Therefore, the signal S at the output of the low pass filter is filtered by the Q filters FLT1 to FLTQ arranged in parallel, the coefficients of which correspond to the components of the N-dimension eigen vectors $f_1$ to $f_q$ associated, respectively, with the Q eigenvalues greater than 1 of the matrix $B^{-1}A$. The coefficients $S*f_n$, with n falling between 1 and Q, thus represent the signal S filtered by the filters FLT1 to FLTQ.

At this stage, the overall signal-to-noise ratio is improved, but the processing carried out has greatly deformed the original signal. It may then be necessary to reconstruct the signal from the signals $S*f_n$ with n falling between 1 and Q.

In order to accomplish this, at the output of each filter FLT1 to FLTQ, multiplication means $M_1$ to $M_Q$ enable the signal obtained to be multiplied by the central coefficient $y_n$ of the vector $y_n$, obtained from the product between the variance-covariance matrix B of the noises and the previously defined associated vector $f_n$:

$Y_n = Bf_n$, this relationship being understood as the product of the matrix B and the vector $f_n$, with n falling between 1 and Q.

It is to be noted that there will therefore be as many vectors $Y_n$ as filters FLTQ.

Each of the coefficients $S*f_n$ is therefore multiplied by the central coefficient $y_n$, with n falling between 1 and Q. Summation means $P_1$ to $P_{Q-1}$ are then provided in order to sum up the vectors resulting from all of these operations, so as to obtain, at the output, a vector S of length N, having the formula:

$$\tilde{S} = \sum_{n=1}^{Q} S * f_n y_n$$

The signal $\tilde{S}$ is thus a reformatted signal having a more favorable signal-to-noise ratio than the signal S at the input of the device, the filters FLT1 to FLTQ being optimal in one embodiment in terms of the signal-to-noise ratio.

This signal is then supplied to the input of a comparator COMP in order to be compared to a threshold value V0, thereby making it possible to recover a binary signal $\tilde{S}b$ at the output of the stochastic matched filtering unit. The processing then continues in a conventional manner using the matched filter 36. Advantageously, as a result of the matched filtering unit, a signal having a much better quality, in terms of the signal-to-noise ratio, exists at the input of the matched filter 36, which will make it much easier to select the synchronization of the wanted signal in the matched filter 36.

A configuration example of an optimal filter 37 according to an embodiment of the invention, which is involved in the receiver chain via undersampling, is presented hereinbelow. In this example the signal to be encoded and transmitted has a bandwidth B=2 MHz. Said signal will be encoded by a Barker code of length 11 and modulated by a carrier frequency of 2.45 GHz.

The encoded signal is modulated and transmitted in the transmission channel, then received by an RF antenna and amplified by an LNA. It is recognized that the signal has experienced the interference from the transmission channel, which is assumed to have very low correlation (white noise).

To be able to observe the effectiveness of adding the stochastic matched filtering unit, the situation will be used in which the signal-to-noise ratio (SNR) is equal to 0 dB. In this specific case, the conventional digital chain supplies unsatisfactory results.

The undersampling frequency Fe in the ADC is fixed as $Fe \geq 4B = 8$ MHz. In this case, Fe=4B=8 MHz.

As was seen, the parameters that define the characteristics of the filters are Q and N, i.e., their number and order, respectively. In our example, N is equal to 5; each filter will thus be of the fifth order. The calculations performed according to the principles set forth above result in the assumption that Q is equal to 3, which provides the number of filters of the fifth order that are used. The filters $Y_n$ serve only to supply the mean coefficient $y_n$. The Table below (Tab. 1) supplies the various coefficients of the optimal filter for the $f_n$, $Y_n$ and $y_n$ considered in our example, with n falling between 1 and 3.

TABLE 1

Coefficients of the optimal filter 37 with N = 5 and Q = 3.

|  | N = 1 | N = 2 | N = 3 | N = 4 | N = 5 |
|---|---|---|---|---|---|
| f1(Q = 1) | 0.5899 | −0.9174 | 1.2715 | −0.9147 | 0.5899 |
| f2(Q = 2) | −0.7892 | 0.5078 | −0.0000 | −0.5078 | 0.7892 |
| f3(Q = 3) | 0.4360 | 0.5652 | 0.5072 | 0.5652 | 0.4360 |
| Y1(Q = 1) | 0.1404 | −0.2444 | y1 = 0.3034 | −0.2444 | 0.1404 |
| Y2(Q = 2 | −0.5283 | 0.1636 | y2 = 0.000 | −0.1636 | 0.5283 |
| Y3(Q = 3) | 0.1859 | 0.4969 | y3 = 0.5445 | 0.4969 | 0.1859 |

With a configuration of the optimal filter according to the values in Table 1, a significant improvement in the signal-to-noise ratio can be observed. As a matter of fact, between the output of the low pass filter 35 and the output of the optimal filter 37, the SNR passes from 1.2 db to 5.25 db.

Generally speaking, the addition of the optimal filter 37 to the receiver chain makes it possible to increase the signal-to-noise ratio, prior to using the matched filter 36, an average of 4 to 5 dB. To illustrate this effect, the two tables below (Tab. 2 and Tab. 3) supply the signal-to-noise ratio (SNR) at various points along the chain, for a conventional chain (FIG. 2) and for a chain with an optimal filter based on stochastic matched filtering (FIG. 3), respectively, and the number of resulting bit errors per 1,000 bit-times of the chain. It appears that the number of bit errors is sharply reduced with the addition of an optimal filter, as compared to the conventional solution.

TABLE 2

Simulation per 1,000 bit-times for the conventional receiver chain.

| Receiver SNR | Post-ADC SNR | Pre-matched filter SNR | Number of bit errors/1,000 |
|---|---|---|---|
| 5 dB | 6.8 dB | 7 dB | 0 |
| 3 dB | 5.4 dB | 6.5 dB | 4 |
| 0 dB | 1.2 dB | 1.37 dB | 205 |

TABLE 3

Simulation per 1,000 bit-times for the receiver chain with optimal filter 37 according to an embodiment of the invention.

| Receiver SNR | Post-ADC SNR | Pre-matched filter SNR | Number of bit errors/1,000 |
|---|---|---|---|
| 5 dB | 6.8 dB | 11 dB | 0 |
| 3 dB | 5.4 dB | 10.6 dB | 0 |
| 0 dB | 1.2 dB | 5.25 dB | 20 |

Thus, the use of an optimal filter according to an embodiment of the invention in the processing chain may make it possible to utilize a digital/digital/digital chain in RF communications, even in a noisy environment. By comparison to a conventional approach, this structure makes it possible to bring about a reduction of the costs (in terms of power consumed), but also an increase in the speed and range of transmission.

An electronic system, such as a cell phone or wireless LAN, may incorporate the RF part of FIG. 4 according to an embodiment of the invention.

From the foregoing it will be appreciated that, although specific embodiments of the invention have been described herein for purposes of illustration, various modifications may be made without deviating from the spirit and scope of the invention.

The invention claimed is:

1. Digital processing device for a modulated signal, arranged at the input of a radio frequency receiver chain, suited in particular to a transmission system using binary carrier phase modulation by means of a binary message on which a direct sequence spread spectrum operation has been carried out, this device comprising an analog-to-digital converter performing undersampling of the signal received, leading to an at least partial overlapping of the frequency range of the undersampled wanted signal by the frequency range of an interfering signal, demodulation means connected at the output of the analog-to-digital converter in order to bring the undersampled wanted signal back to baseband, a low pass filter connected at the output of the demodulation means and a filter matched to a spreading code used, wherein said device includes an additional filtering unit arranged between the low pass filter and the matched filter, said filtering unit implementing a stochastic matched filtering operation to improve the signal-to-noise ratio at the input of the filter matched to the spreading code.

2. Processing device as claimed in claim 1 wherein the additional filtering unit includes a plurality Q of finite response base filters mounted in parallel, each of which receives the undersampled signal supplied at the output of the low pass filter, each filter being characterized by a set of N coefficients, this number N being determined such that it corresponds to the minimum number of samples for describing one bit of the spread message, the coefficients of each of the Q filters corresponding respectively to components of Q eigen vectors associated with at least Q eigen values greater than 1 of a matrix $B^{-1}A$, where B is the variance-covariance matrix of the interfering signal and A the variance-covariance matrix of the wanted signal.

3. Processing device as claimed in claim 2 wherein for each filter of the plurality Q of finite response filters, the additional filtering unit includes means for multiplying the signal obtained at the output of said filter, with, respectively, the central coefficient of the vector resulting from the product between the variance-covariance matrix of the interfering signal and the eigen vector defining the coefficients of said filter, said unit further comprising means of summing up the vectors resulting from all of these operations, supplying a signal corresponding to the output signal of the reformatted low pass filter having an improved signal-to-noise ratio.

4. Processing device as claimed in claim 3, further comprising a comparator installed at the output of the additional filtering unit, capable of comparing the amplitude of the output signal supplied by the summation means to a reference value and of delivering a binary signal at the output of the filtering unit based on said comparison.

5. Processing device as claimed in claim 4 wherein the comparator has an adjustable reference value.

6. Processing device as claimed in claim 2, further comprising inserted between the analog-to-digital converter and the demodulation means, it includes an estimation unit provided for estimating the center frequency of the signal after undersampling, the signal present at the output of the estimation unit being filtered by a band-pass filter before being applied to the demodulation means, so as to retain only a single spectral motif from amongst the plurality of spectral motifs representative of the signal after undersampling.

7. Processing device as claimed in claim 6 wherein the estimation unit includes means for determining the parameter N defining the order of the filters of the plurality Q of finite response filters of the additional filtering unit, and for configuring the additional filtering unit with said parameter N.

8. Processing device as claimed in claim 1 wherein the interfering signal corresponds to the transmission channel noise.

9. Processing device as claimed in claim 1 wherein the sampling frequency corresponds to at least twice the bandwidth of the signal transmitted.

10. Processing device as claimed in claim 1 wherein the filter matched to the spreading code is a digital finite impulse response filter.

11. A receiver, comprising:
an analog-to-digital converter operable to convert a modulated analog signal into an under-sampled digital modulated signal, the modulated analog signal including a first component having a frequency spectrum spread to a first-component bandwidth according to a spreading code and including a second component, the converter operable to sample the modulated analog signal at a sampling frequency at least twice the first-component bandwidth;
a demodulator coupled to the analog-to-digital converter and operable to recover from the under-sampled signal a demodulated digital signal including the first and second components having respective strengths;
an emphasizer coupled to the demodulator and operable to generate a modified demodulated digital signal from the demodulated digital signal by increasing the strength of the first component of the demodulated digital signal relative to the strength of the second component of the demodulated digital signal; and
a de-spreader coupled to the emphasizer and operable to generate a digital baseband signal from the modified demodulated digital signal and the spreading code.

12. The receiver of claim 11 wherein the second component of the modulated analog signal comprises a noise component.

13. The receiver of claim 11, further comprising:
an estimator coupled between the converter and the demodulator and operable to determine a center frequency of the under-sampled signal;
a band-pass filter coupled between the estimator and the demodulator, having substantially twice the first-component bandwidth substantially centered about the center frequency, and operable to generate a filtered under-sampled signal; and
wherein the demodulator includes,
an oscillator operable to generate a demodulation signal having a frequency substantially equal to the center frequency; and
a mixer coupled to the oscillator, operable to receive the filtered under-sampled signal from the band-pass filter, and operable to generate the demodulated digital signal as a product of the filter under-sampled signal and the demodulation signal.

14. The receiver of claim 13, further comprising a low-pass filter coupled between the demodulator and the emphasizer and having substantially the first-component bandwidth.

15. The receiver of claim 11, further comprising:
wherein the modified demodulated digital signal comprises an amplitude; and
a comparator coupled to the emphasizer and operable to generate a binary signal having a first level if the amplitude of the modified demodulated digital signal is greater than a threshold and having a second level if the amplitude is less than the threshold.

16. The receiver of claim 11 wherein the emphasizer comprises:
a finite-impulse-response filter operable to generate an intermediate signal from the demodulated digital signal; and
a multiplier coupled to the filter and operable to generate the modified demodulated digital signal from a product of the intermediate signal and a predetermined value.

17. The receiver of claim 11 wherein the emphasizer comprises:
finite-impulse-response filters each operable to generate a respective first intermediate signal from the demodulated digital signal;
multipliers each coupled to a respective filter and each operable to generate a respective second intermediate signal equal to a product of a respective first intermediate signal and a respective predetermined value; and
an adder circuit operable to generate the modified demodulated digital signal from a sum of the second intermediate signals.

18. The receiver of claim 11 wherein:
the first component of the demodulated digital signal has a symbol rate; and
the emphasizer comprises,
a finite-impulse-response filter having an order related to a quotient of the sampling frequency divided by the symbol rate and operable to generate an intermediate signal from the demodulated digital signal, and
a multiplier coupled to the filter and operable to generate the modified demodulated digital signal from a product of the intermediate signal and a predetermined value.

19. The receiver of claim 11 wherein the emphasizer comprises:
a finite-impulse-response filter having one or more coefficients related to an autocorrelation of the spreading code and operable to generate an intermediate signal from the demodulated digital signal; and
a multiplier coupled to the filter and operable to generate the modified demodulated digital signal from a product of the intermediate signal and a predetermined value.

20. The receiver of claim 11 wherein the emphasizer comprises:
a finite-impulse-response filter having one or more coefficients related to an autocorrelation of the second component of the modulated analog signal and operable to generate an intermediate signal from the demodulated digital signal; and
a multiplier coupled to the filter and operable to generate the modified demodulated digital signal from a product of the intermediate signal and a predetermined value.

21. The receiver of claim 11 wherein the emphasizer comprises:

a finite-impulse-response filter having coefficients related to elements of an eigen vector of a product of a variance-covariance matrix of the spreading code and a transpose of a variance-covariance matrix of the second component of the modulated analog signal, the eigen vector being associated with an eigen value of the product greater than one, the filter operable to generate an intermediate signal from the demodulated digital signal; and
a multiplier coupled to the filter and operable to generate the modified demodulated digital signal from a product of the intermediate signal and a vector value related to a product of the variance-covariance matrix of the second component of the demodulated analog signal and the eigen vector.

22. The receiver of claim 11 wherein the emphasizer comprises:
a finite-impulse-response filter having coefficients respectively equal to elements of an eigen vector of a product of a variance-covariance matrix of the spreading code and a transpose of a variance-covariance matrix of the second component of the modulated analog signal, the eigen vector being associated with an eigen value of the product greater than one, the filter operable to generate an intermediate signal from the demodulated digital signal; and
a multiplier coupled to the filter and operable to generate the modified demodulated digital signal as a vector equal to a product of the intermediate signal and a vector value equal to a product of the variance-covariance matrix of the second component of the demodulated analog signal and the eigen vector.

23. A system, comprising:
a receiver, comprising,
an analog-to-digital converter operable to convert a modulated analog signal into an under-sampled digital modulated signal, the modulated analog signal including a first component having a frequency spectrum spread to a first-component bandwidth according to a spreading code and including a second component, the converter operable to sample the modulated analog signal at a sampling frequency at least twice the first-component bandwidth;
a demodulator coupled to the analog-to-digital converter and operable to recover from the under-sampled signal a demodulated digital signal including the first and second components having respective strengths;
an emphasizer coupled to the demodulator and operable to generate a modified demodulated digital signal from the demodulated digital signal by increasing the strength of the first component of the demodulated digital signal relative to the strength of the second component of the demodulated digital signal; and
a de-spreader coupled to the emphasizer and operable to generate a digital baseband signal from the modified demodulated digital signal and the spreading code.

24. A method, comprising:
receiving a modulated analog signal at a receiver
undersampling the modulated analog signal at a sampling frequency to generate an under-sampled digital modulated signal, the modulated analog signal including a first component having a frequency spectrum spread to a first-component bandwidth according to a spreading code and including a second component, the sampling frequency being at least twice the first-component bandwidth;

recovering from the under-sampled signal a demodulated digital signal including the first and second components having respective strengths;

generating a modified demodulated digital signal from the demodulated digital signal by reducing the strength of the second component of the demodulated digital signal relative to the strength of the first component of the demodulated digital signal;

generating a digital baseband signal from the modified demodulated digital signal and the spreading code; and outputting the digital baseband signal at an output of the receiver.

25. The method of claim 24, further comprising:

determining a center frequency of the under-sampled signal;

generating a filtered under-sampled signal having substantially twice the first-component bandwidth substantially centered about the center frequency; and wherein recovering includes, generating a demodulation signal having a frequency substantially equal to the center frequency, and generating the demodulated digital signal as a product of the filtered under-sampled signal and the demodulation signal.

26. The method of claim 24, further comprising:

limiting a bandwidth of the demodulated digital signal to substantially the first-component bandwidth; and generating the modified demodulated digital signal from the bandwidth-limited demodulated digital signal.

27. The method of claim 24, further comprising:

generating a binary signal having a first level if an amplitude of the modified demodulated digital signal is greater than a threshold and having a second level if the amplitude is less than the threshold; and wherein generating the digital baseband signal comprises generating the digital baseband signal from the binary signal.

28. The method of claim 24 wherein generating the modified demodulated digital signal comprises:

generating an intermediate signal from the demodulated digital signal with a finite-impulse-response filter; and generating the modified demodulated digital signal from a product of the intermediate signal and a predetermined value.

29. The method of claim 24, further comprising:

receiving the modulated analog signal from a propagation channel; and wherein the second component of the modulated analog signal comprises noise from the channel.

30. The method of claim 24 wherein generating the modified demodulated digital signal comprises:

generating an intermediate signal from the demodulated digital signal using a finite-impulse-response filter; and generating the modified demodulated digital signal by multiplying the intermediate signal by a predetermined value.

31. The method of claim 24 wherein generating the modified demodulated digital signal comprises:

generating first intermediate signals from the demodulated signal using respective finite-impulse-response filters;

generating second intermediate signals by multiplying each of the first intermediate signals by a respective predetermined value; and generating the modified demodulated digital signal by summing together the second intermediate signals.

32. The method of claim 24 wherein:

the first component of the demodulated digital signal has a symbol rate; and modulating the demodulated digital signal comprises, generating an intermediate signal from the demodulated digital signal with a finite-impulse-response filter having an order related to a quotient of the sampling frequency divided by the symbol rate, and generating the modified demodulated digital signal by multiplying the intermediate signal by a predetermined value.

33. The method of claim 24 wherein generating the modified demodulated digital signal comprises:

generating an intermediate signal from the demodulated digital signal using a finite-impulse-response filter having one or more coefficients related to an autocorrelation of the spreading code; and generating the modified demodulated digital signal by multiplying the intermediate signal by a predetermined value.

34. The method of claim 24 wherein generating the modified demodulated digital signal comprises:

generating an intermediate signal from the demodulated digital signal using a finite-impulse-response filter having one or more coefficients related to an autocorrelation of the second component of the modulated analog signal; and generating the modified demodulated digital signal by multiplying the intermediate signal by a predetermined value.

35. The method of claim 24 wherein generating the modified demodulated digital signal comprises:

generating an intermediate signal from the demodulated digital signal using a finite-impulse-response filter having one or more coefficients related to an autocorrelation of the second component of the demodulated digital signal; and generating the modified demodulated digital signal by multiplying the intermediate signal by a predetermined value.

36. The method of claim 24 wherein generating the modified demodulated digital signal comprises:

generating an intermediate signal from the demodulated digital signal using a finite-impulse-response filter having coefficients related to elements of an eigen vector of a product of a variance-covariance matrix of the spreading code and a transpose of a variance-covariance matrix of the second component of the modulated analog signal, the eigen vector being associated with an eigen value of the product greater than one; and generating the modified demodulated digital signal by multiplying the intermediate signal by a vector value related to a product of the variance-covariance matrix of the second component of the modulated analog signal and the eigen vector.

37. The method of claim 24 wherein generating the modified demodulated digital signal comprises:

generating an intermediate signal from the demodulated digital signal using a finite-impulse-response filter having coefficients related to elements of an eigen vector of a product of a variance-covariance matrix of the spreading code and a transpose of a variance-covariance matrix of the second component of the demodulated digital signal, the eigen vector being associated with an eigen value of the product greater than one; and generating the modified demodulated digital signal by multiplying the intermediate signal by a vector value related to a product of the variance-covariance matrix of the second component of the demodulated digital signal and the eigen vector.

38. The method of claim 24 wherein generating the modified demodulated digital signal comprises:

generating an intermediate signal from the demodulated digital signal using a finite-impulse-response filter having coefficients respectively equal to elements of an eigen vector of a product of a variance-covariance matrix of the spreading code and a transpose of a variance-covariance matrix of the second component of the modulated analog signal, the eigen vector being associated with an eigen value of the product greater than one; and generating the modified demodulated digital signal as a vector by multiplying the intermediate signal by a vector value equal to a product of the variance-covariance matrix of the second component of the modulated analog signal and the eigen vector.

* * * * *